(12) United States Patent
Archambault et al.

(10) Patent No.: US 8,467,688 B2
(45) Date of Patent: Jun. 18, 2013

(54) TELECOMMUNICATIONS TRANSPORT METHODS AND SYSTEMS FOR EXTENDED REACH LOW DIFFERENTIAL LATENCY

(75) Inventors: Jean-Luc Archambault, Severna Park, MD (US); Steven Arvo Surek, Leonardo, NJ (US); Martin Nuss, Boulder, CO (US)

(73) Assignee: Ciena Corporation, Hanover, MD (US)

( * ) Notice: Subject to any disclaimer, the term of this patent is extended or adjusted under 35 U.S.C. 154(b) by 1391 days.

(21) Appl. No.: 11/855,514

(22) Filed: Sep. 14, 2007

(65) Prior Publication Data

US 2009/0067844 A1    Mar. 12, 2009

Related U.S. Application Data

(63) Continuation-in-part of application No. 11/599,662, filed on Nov. 15, 2006.

(60) Provisional application No. 60/760,263, filed on Jan. 19, 2006.

(51) Int. Cl.
*H04B 10/12* (2006.01)
*H04B 10/2513* (2006.01)

(52) U.S. Cl.
CPC .............................. *H04B 10/25133* (2013.01)
USPC .......................................................... 398/149

(58) Field of Classification Search
USPC ........ 398/81, 160, 41–42, 147–150, 158–159
See application file for complete search history.

(56) References Cited

U.S. PATENT DOCUMENTS

| | | | | |
|---|---|---|---|---|
| 4,638,483 A * | 1/1987 | Bowers | ........................... | 372/26 |
| 5,673,133 A * | 9/1997 | Imaoka et al. | ................ | 398/202 |
| 5,742,416 A * | 4/1998 | Mizrahi | ........................... | 398/92 |
| 5,801,858 A * | 9/1998 | Roberts et al. | .................. | 398/97 |
| 6,005,997 A * | 12/1999 | Robinson et al. | ............... | 385/24 |
| 6,018,404 A * | 1/2000 | Meli et al. | ........................... | 398/1 |
| 6,101,016 A * | 8/2000 | Roberts et al. | .................. | 398/97 |
| 6,157,477 A * | 12/2000 | Robinson | ....................... | 398/147 |
| 6,388,805 B1 * | 5/2002 | Spock et al. | ............... | 359/341.2 |
| 6,396,625 B1 * | 5/2002 | Nakaji | ....................... | 359/341.41 |
| 6,480,312 B1 * | 11/2002 | Okuno et al. | .................. | 398/158 |
| 6,577,424 B1 * | 6/2003 | Lin | .................................. | 398/75 |
| 6,590,684 B1 * | 7/2003 | Goodfellow | .................. | 398/149 |
| 6,704,517 B1 * | 3/2004 | Gaubatz | ........................ | 398/147 |
| 6,768,578 B1 * | 7/2004 | Kinoshita et al. | .............. | 359/337 |
| 6,819,481 B2 * | 11/2004 | Delavaux et al. | ........... | 359/341.2 |
| 6,891,663 B2 * | 5/2005 | Kinoshita et al. | .......... | 359/337.5 |
| 6,907,199 B2 * | 6/2005 | Koch et al. | ....................... | 398/81 |
| 6,943,940 B2 * | 9/2005 | Kinoshita et al. | ............. | 359/349 |
| 7,113,489 B2 * | 9/2006 | Lindsey et al. | ............... | 370/276 |

(Continued)

*Primary Examiner* — Danny Leung (74) *Attorney, Agent, or Firm* — Clements Bernard PLLC; Christopher L. Bernard; Lawrence A. Baratta, Jr.

(57) ABSTRACT

Systems and methods for extended reach low differential latency optical networking with optical amplifiers and dispersion compensation modules configured to minimize latency between transmit and receive paths are provided. Additionally, systems and methods are provided for incorporating absolute time references wherein the relative accuracy of clock time between various servers used in various multi-site enterprises is required. The transport systems and methods are used in conjunction with low differential latency systems. The transport systems and methods provide that the differential latency between transmit and receive directions is maintained within about +/−5 microseconds of the transmit/receive path differential delay requirement in order to perform within the overall parameters of the low differential latency system architecture.

15 Claims, 5 Drawing Sheets

U.S. PATENT DOCUMENTS

| | | | |
|---|---|---|---|
| 7,158,698 B2* | 1/2007 | Ito | 385/24 |
| 7,164,527 B2* | 1/2007 | Denkin et al. | 359/341.43 |
| 7,310,318 B1* | 12/2007 | Frankel et al. | 370/252 |
| 7,324,758 B2* | 1/2008 | Marutani et al. | 398/147 |
| 7,346,280 B1* | 3/2008 | Sguazzotti et al. | 398/92 |
| 7,408,702 B2* | 8/2008 | Krylov et al. | 359/341.42 |
| 7,412,371 B2* | 8/2008 | Fisher et al. | 703/17 |
| 7,512,343 B2* | 3/2009 | Sridhar et al. | 398/147 |
| 7,535,931 B1* | 5/2009 | Zampetti et al. | 370/508 |
| 7,577,366 B2* | 8/2009 | Way | 398/148 |
| 7,689,077 B1* | 3/2010 | DeCusatis | 385/37 |
| 7,711,271 B2* | 5/2010 | Eiselt et al. | 398/181 |
| 7,734,180 B2* | 6/2010 | Maeda et al. | 398/79 |
| 2001/0053008 A1* | 12/2001 | Ueno | 359/158 |
| 2007/0165549 A1* | 7/2007 | Surek et al. | 370/284 |
| 2009/0067844 A1* | 3/2009 | Archambault et al. | 398/81 |

* cited by examiner

TELECOMMUNICATIONS TRANSPORT METHODS AND SYSTEMS FOR EXTENDED REACH LOW DIFFERENTIAL LATENCY

CROSS-REFERENCE TO RELATED APPLICATION(S)

The present non-provisional patent application is a continuation-in-part of co-pending U.S. patent application Ser. No. 11/599,662, filed on Nov. 15, 2006, and entitled "TRANSPORT SYSTEMS AND METHODS INCORPORATING ABSOLUTE TIME REFERENCES AND SELECTIVE BUILDOUT DELAYS," which claims priority to U.S. Provisional Patent Application No. 60/760,263, filed on Jan. 19, 2006, and entitled "TRANSPORT SYSTEMS AND METHODS INCORPORATING ABSOLUTE TIME REFERENCES AND SELECTIVE BUILDOUT DELAYS," all of which are incorporated in full by reference herein.

FIELD OF THE INVENTION

The present invention relates generally to the telecommunications, optical networking, and data networking fields. More specifically, the present invention relates to systems and methods for extended reach low differential latency optical networking with optical amplifiers and dispersion compensation modules configured to minimize or eliminate latency between transmit and receive paths.

BACKGROUND OF THE INVENTION

Data networks, such as International Business Machine (IBM) Geographically-Dispersed Parallel Sysplex (GDPS) system, can provide storage area networks (SANs) that offer effective disaster recovery for geographically diverse and multi-site enterprises. Low differential latency systems, such as a GDPS application, rely on the relative accuracy of clock time between the various nodes in these multi-site networks. Accordingly, systems or methods are needed to maintain clock accuracy in such applications. For example, In IBM's newest generation of GDPS, timing synchronization is maintained between servers via links capable of supporting IBM's Server Time Protocol (STP). In order for STP to perform within the overall parameters of the GDPS system architecture, the differential latency between transmit and receive directions of a link supporting the STP protocol must be maintained within approximately +/−5 µs.

For example, the optical signals propagating in opposite directions (East-West and West-East) along a point-to-point link in a low differential latency system should have nearly identical transit times, to within approximately 5 µs, which corresponds to the time delay in about 1 km of optical fiber. Because the total transit time includes not only the propagation time through the optical system, but also delays in the electronics that drive the optical signal, the East-West and West-East fiber lengths have to be matched to somewhat better than 1 km. Optical low differential latency systems exist today, but with very short spans (less than 100 km). For example, ADVA Optical Networking (ADVA) has disclosed the use of its Fiber Service Platform (FSP) in conjunction with IBM's STP and GDPS. As disclosed by ADVA, the interoperability of the platform (FSP), protocol (STP), and environment (GDPS) will provide enterprise customers with storage network connectivity of up to 100 km.

There is, however, a desire to extend the reach of low differential latency optical systems beyond 100 km. This typically requires the addition of optical amplifiers and dispersion compensation modules (DCMs), which introduce additional time delays, and potentially additional differential latency, in the system. Although amplifiers typically have low latency in the 0.2-0.4 µs range, conventional DCMs based on dispersion-compensating fiber (DCF) can have up to 70 µs latency, depending on the type and manufacturer. Even for the same DCM type and manufacturer, delay variation from module to module can exceed 10 µs. Therefore, it would be extremely difficult to meet low differential latency system specifications with this type of system.

BRIEF SUMMARY OF THE INVENTION

In various exemplary embodiments, the present invention provides transport systems and methods for extended reach low differential latency optical networking between various nodes in a network. In one exemplary embodiment, the transport systems and methods are used in a data network having multiple nodes wherein at least one of the nodes has a low latency DCM, a bidirectional system with shared DCMs, or a delay equalized DCM. In another exemplary embodiment, the network is a Geographically-Dispersed Parallel Sysplex (GDPS) integrated, automated application and data availability solution and associated Server Time Protocol (STP). The transport systems and methods provide that the differential latency between transmit and receive directions of a link greater than 100 km supporting the STP protocol are maintained within +/−5 µs of the transmit/receive path differential delay requirement. Other comparable uses are also contemplated herein, as will be apparent to those of ordinary skill in the art.

In one exemplary embodiment of the present invention, a telecommunications transport system includes a first server complex, a second server complex, wherein the first server complex is in communication with the second server complex via a transmit path and a receive path, at least one dispersion compensation module, and at least one fiber amplifier, wherein the at least one fiber amplifier and the at least one dispersion compensation module are operative to extend the reach of the telecommunications transport system, and wherein the at least one dispersion compensation module and at least one fiber amplifier are configured to minimize differential latency between the transmit and receive paths. Optionally, the telecommunications transport system further includes a mechanism for measuring a transmit/receive path differential delay associated with the transmit path and the receive path, and a mechanism for selectively compensating for the measured transmit/receive path differential delay.

In another exemplary embodiment of the present invention, a telecommunications transport method for maintaining a relative accuracy of clock time between various servers used in various multi-site enterprises includes providing a first server complex, providing a second server complex, wherein the first server complex is in communication with the second server complex via a transmit path and a receive path, providing an at least one dispersion compensation module, and providing an at least one fiber amplifier, wherein the at least one fiber amplifier and the at least one dispersion compensation module are operative to extend the reach between the first and second server complex, wherein the first server complex, the second server complex, the transmit path, and the receive path form an optical low differential latency system. Optionally, the telecommunications transport method further includes measuring a transmit/receive path differential delay associated with the transmit path and the receive path, and selectively compensating for the measured transmit/receive path differential delay.

In yet another exemplary embodiment of the present invention, a data network includes a first node, a second node connected to the first node, and a third node communication with the first and second nodes, wherein the third node communicates a timing signal referenced to a timing reference to the first and second nodes and at least one of the first and second nodes has a dispersion compensation module configured for low latency. The dispersion compensation module includes a low latency dispersion compensation module, and the low latency dispersion compensation module includes one of a channelized etalon dispersion compensation module, a channelized grating dispersion compensation module, and a fiber Bragg broadband grating.

BRIEF DESCRIPTION OF THE DRAWINGS

The present invention is illustrated and described herein with reference to the various drawings, in which like reference numbers denote like system components and/or method steps, respectively, and in which.

DETAILED DESCRIPTION OF THE INVENTION

In various exemplary embodiments, the present invention provides systems and methods incorporating absolute time references in optical networks requiring low differential latency. The present invention ensures the relative accuracy of clock time between various servers used in various multi-site enterprises. In one exemplary embodiment, the transport systems and methods of the present invention are used in conjunction with the International Business Machine Corporation (IBM) Geographically-Dispersed Parallel Sysplex (GDPS) integrated, automated application and data availability solution and associated Server Time Protocol (STP). The transport systems and methods of the present invention provide that the differential latency between transmit and receive directions of a link supporting the STP protocol are maintained within +/−5 μs of the transmit/receive path differential delay requirement in order for STP to perform within the overall parameters of the GDPS system architecture. Other comparable uses are also contemplated herein, as will be apparent to those of ordinary skill in the art.

The present invention includes a low differential latency system with low latency DCMs, a bidirectional low differential latency system, delay equalized DCMs, and the like to meet low differential latency system specifications. Low latency DCMs can be based on other technologies besides DCF, such as fiber Bragg gratings or etalons. These alternative DCMs have very low latency, typically less than about 0.2 μs, therefore providing an excellent solution for extended reach low differential latency systems. One disadvantage of using fiber Bragg grating or etalon-based DCMs, however, is that they are typically 'channelized' devices, i.e. they are designed for specific wavelength division multiplexed (WDM) channel spacing, wherein a device designed for 100 GHz channel spacing will not work for 50 GHz channel spacing, etc. Broadband gratings, however, which provide broadband compensation, can be used with arbitrary channel spacing.

In a bidirectional low differential latency system, East-West and West-East optical signals share a single set of amplifiers and DCM's. This can be achieved by assigning two separate regions (red and blue) of the amplifiers' optical bandwidth to the two counter-propagating signals. An advantage to this approach is that it eliminates the time delay difference that is not only associated with the DCM's, but also with the propagation fiber and amplifiers as well, since the two signals essentially travel through the same system. Another advantage is that the cost associated with amplifiers and DCM's is initially cut in half. A disadvantage is that there typically needs to be a guardband, i.e. an unusable portion of the spectrum, between the red and blue bands, to accommodate the roll-off of the red/blue filter spectral response. Another disadvantage is the added cost, loss, complexity associated with the red/blue filters, and increased complexity in network operation.

DCF-based DCM's are typically specified in terms of their total dispersion. For example, a standard 80 km DCM is optimized to compensate for the amount of dispersion typically found in 80 km of standard single-mode fiber (e.g. SMF-28). DCF manufacturers optimize the length of DCF that they put on a spool to achieve this dispersion within specified tolerances. Because dispersion per unit length varies from batch to batch and depends on the DCF design, the length required and therefore the time delay can vary considerably. However, it would be possible instead for the suppliers to adjust the DCF length to achieve a specific time delay, which would be more suitable for low differential latency system applications. Of course this would mean that the dispersion variation would now increase, but this would in most cases still be within the dispersion tolerance of the optical system.

Figure 1:
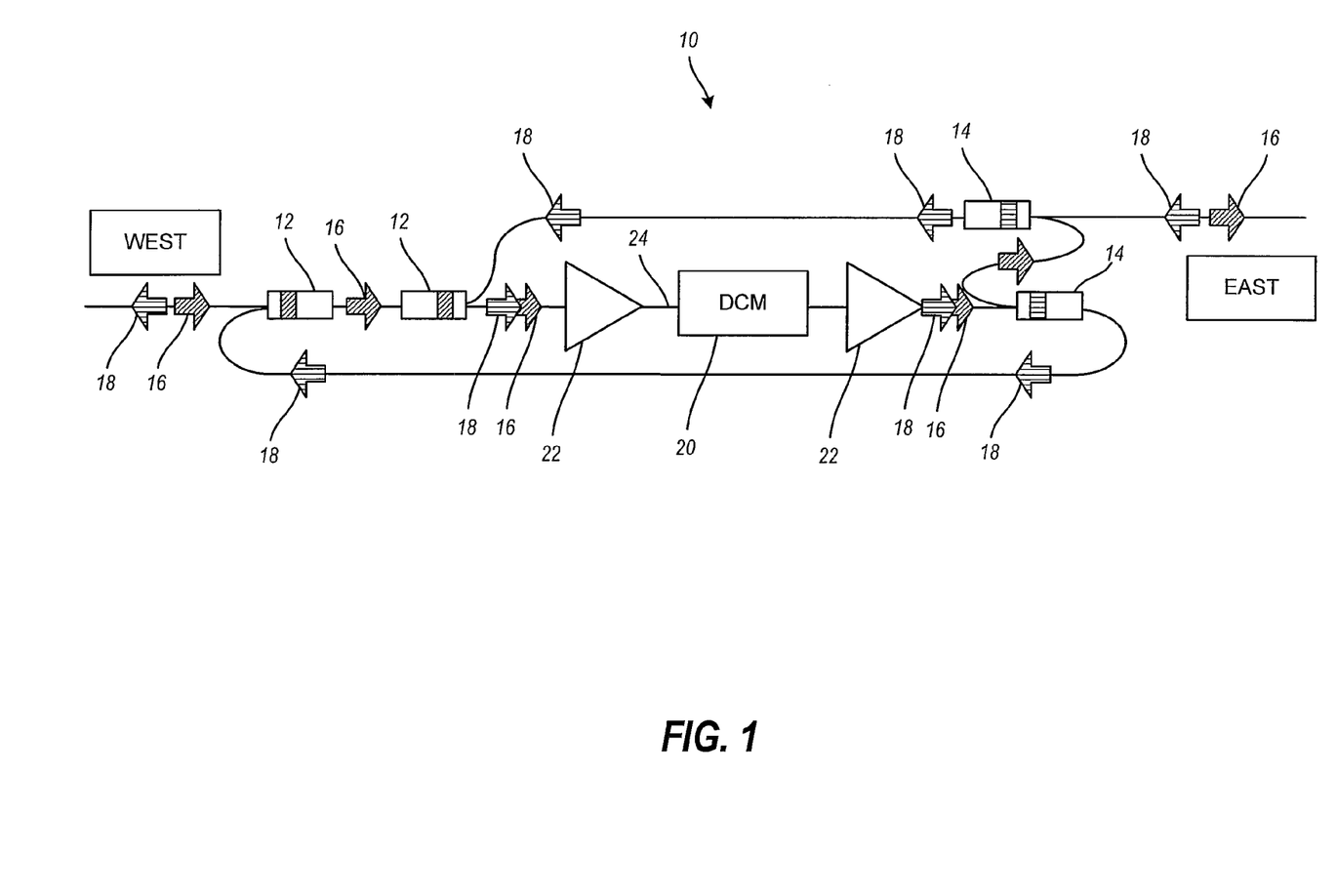
FIG. 1 is a schematic diagram illustrating a bidirectional low differential latency system according to one exemplary embodiment of the present invention, illustrating, in particular, the use of four 3-port filters (two red bandpass filters and two blue bandpass filters), creating a fully bidirectional system wherein counter-propagating red and blue signals travel on a single fiber.

Referring to FIG. 1, a bidirectional low differential latency system with a single-fiber red/blue configuration 10 is shown. This single-fiber red/blue configuration 10 illustrates the use of four 3-port filters (two red bandpass filters 12 and two blue bandpass filters 14), creating a fully bidirectional system wherein counter-propagating red signals 16 and blue signals 18 travel on a single fiber 24. In this exemplary embodiment, the East-to-West and West-to-East optical signals share a single set of amplifiers 22 and a DCM 20. This arrangement is achieved by assigning two separate regions (red and blue) of the optical bandwidth for each amplifier 22 to the two counter-propagating signals 16, 18.

The filter colors describe the filter wavelength. A red filter 12 transmits the longer red wavelengths and reflects the shorter blue wavelengths. A blue filter 14 transmits the shorter blue wavelengths and reflects the longer red wavelengths. Red wavelengths typically refer to wavelengths between 1546 and 1564 nm. Blue wavelengths typically refer to wavelengths between 1529 and 1546 nm.

Four 3-port filters 12, 14 are required to create a fully bidirectional system where the counter-propagating red and blue signals 16, 18 travel on the single fiber 24. Those skilled in the art will recognize that a similar configuration is achieved using only two 4-port filters; however, 3-port filters are more readily available on the market. A key advantage for this approach is that it eliminates the time delay difference not only associated with the DCMs but with the propagation fiber 24 and amplifiers 22 as well, since the two signals 16, 18 essentially travel through the same system. Another advantage is that the cost associated with amplifiers and DCMs is cut in half, at least initially. A guardband, i.e. an unusable portion of the spectrum, may be used between the red and blue bands, to accommodate the roll-off of the red/blue filter spectral response.

Figure 2:
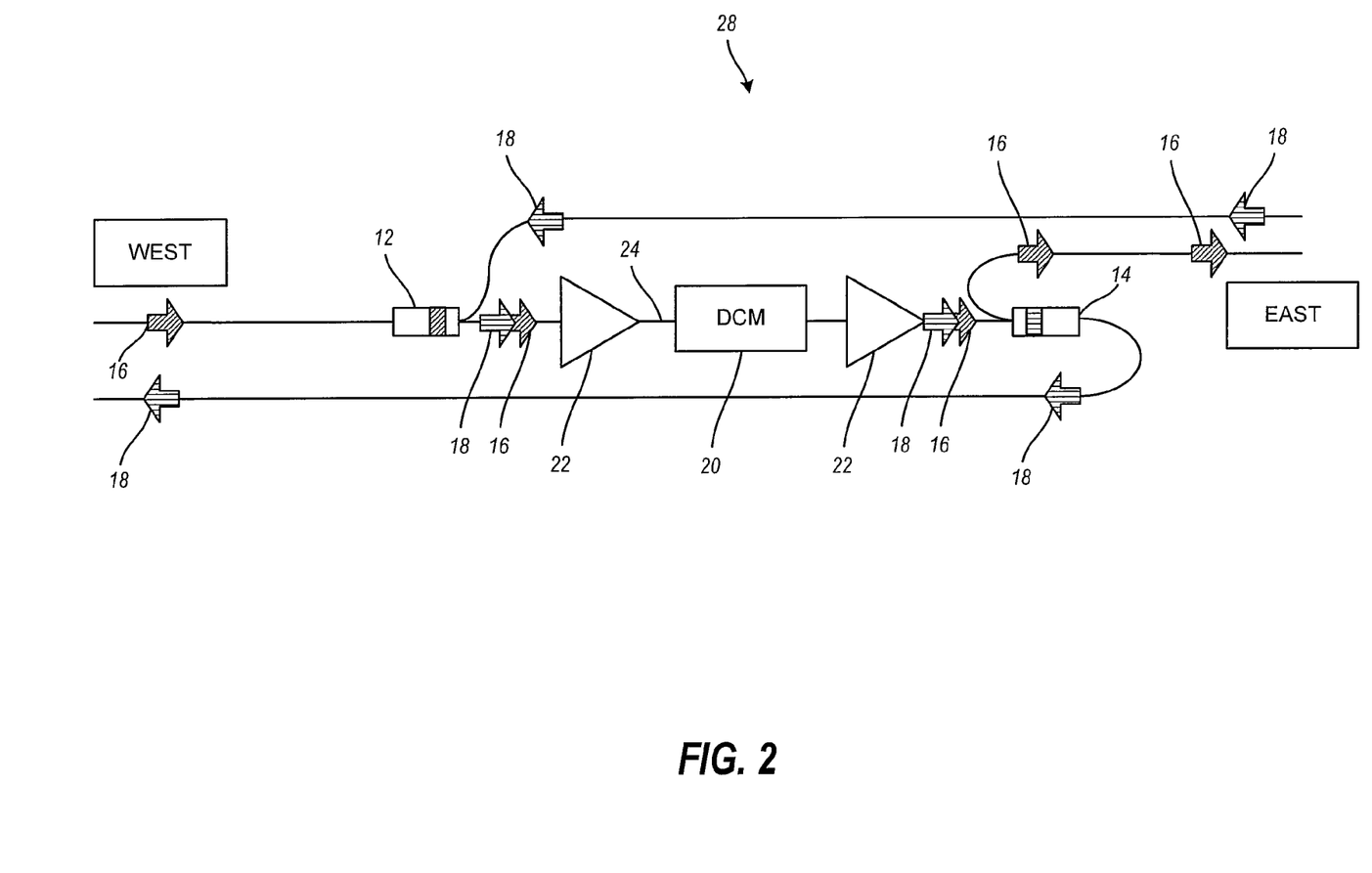
FIG. 2 is a schematic diagram illustrating a bidirectional low differential latency system according to another exemplary embodiment of the present invention, illustrating, in particular, the use of two 3-port filters (one red bandpass filter and one blue bandpass filter), creating a system wherein counter-propagating red and blue signals travel on separate fibers, but share a common set of amplifiers and DCMs.

Referring to FIG. 2, a bidirectional low differential latency system with a two-fiber red/blue configuration 28 is shown. The two-fiber red/blue configuration 28 illustrates the use of two 3-port filters (one red bandpass filter 12 and one blue bandpass filter 14). By using fewer red and blue filters 12, 14, the two-fiber red/blue configuration 28 operates in a more cost-efficient manner and provides less signal loss. In the two-fiber red/blue configuration 28, the red signals 16 and blue signals 18 now propagate on separate fibers 26,27. Therefore the fiber delays are equalized separately to support GDPS. For example, the fibers 26,27 can be in the same conduit providing a similar length. Further, the present invention can utilize a selective buildout delay as described herein to minimize differential latency due to fiber length differences between the fibers 26,27.

In this exemplary embodiment, the East-to-West and West-to-East optical signals share a single set of amplifiers 22 and a DCM 20, and therefore avoid differential latency based on the amplifiers 22 and DCM 20. This arrangement is achieved by assigning two separate regions (red and blue) of the optical bandwidth for each amplifier 22 to the two counter-propagating signals 16, 18.

Those skilled in the art will appreciate that interleavers (not shown) can optionally be used, in a single-fiber red/blue configuration 10 or in a two-fiber red/blue configuration 28, or the like, instead of red and blue filters 12, 14. Interleavers are passive fiber-optic device that are used to combine two sets of dense wavelength-division multiplexing (DWDM) channels (odd and even channels) into a composite signal stream in an interleaving way. For example, optical interleavers take two multiplexed signals with 100 GHz spacing and interleaves them, creating a denser DWDM signal with channels spaced 50 GHz apart. The process can be repeated, creating even denser composite signals with 25 GHz or 12.5 GHz spacing. When interleavers are implemented in such an alternative embodiment, the amplifier bandwidth is split into odd and even channels, rather than blue and red channels. Interleavers tend to be more expensive than filters, but would not require any guardband thereby providing more bandwidth.

Figure 3:
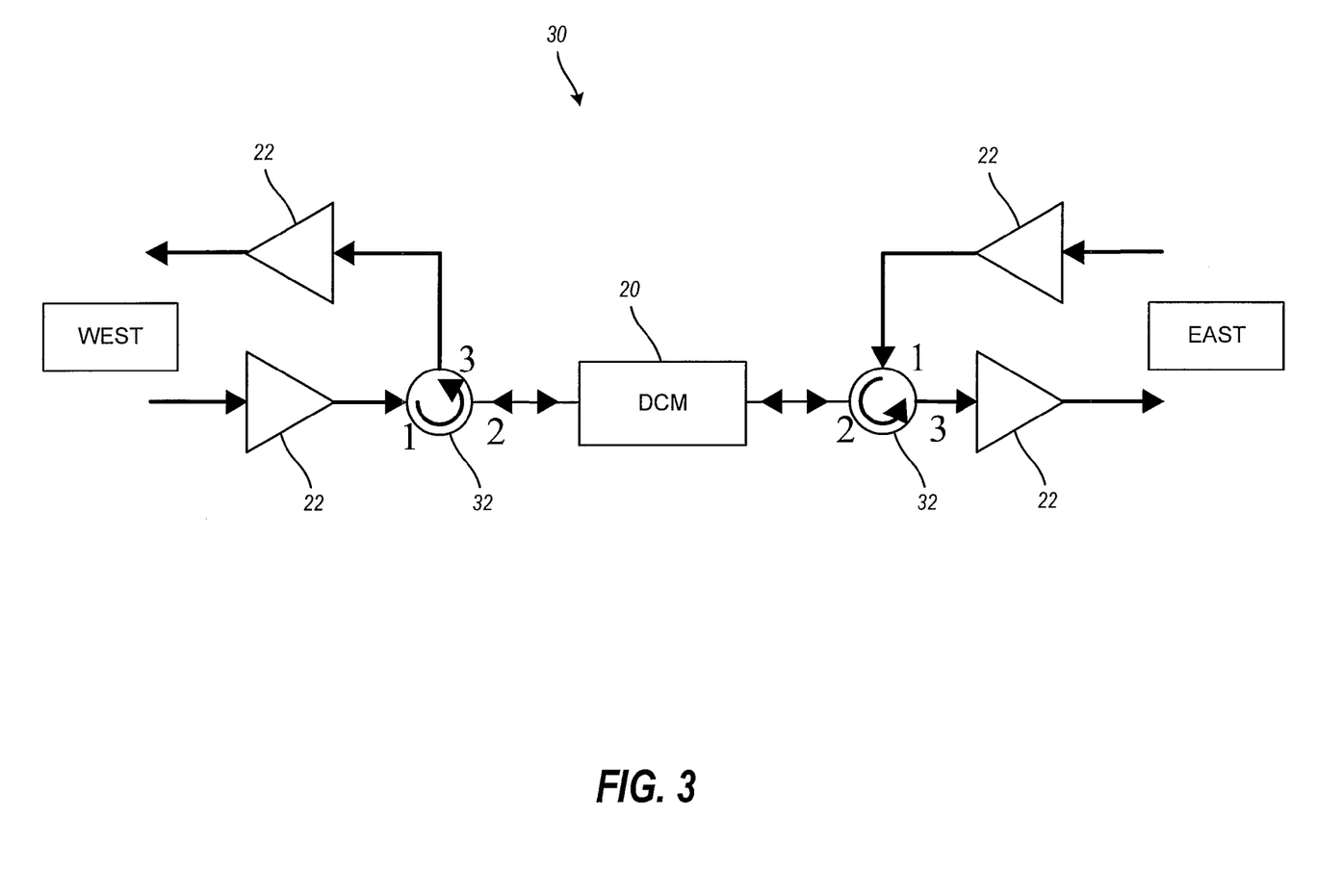
FIG. 3 is a schematic diagram illustrating a bidirectional low differential latency system according to a further exemplary embodiment of the present invention, illustrating, in particular, the employment of two separate line systems, thus providing the entire amplifier bandwidth in each direction, and using a 3-port circulator at the input and output of the DCM.

Referring to FIG. 3, a bidirectional low differential latency system with a shared DCM configuration 30 is shown, illustrating, in particular, the use of two separate line systems in an alternative embodiment. The shared DCM configuration 30 includes a DCM 20 and multiple amplifiers 22. The shared DCM configuration 30 illustrates the entire amplifier bandwidth provided in each direction and the use of a 3-port circulator 32 at the input and output of the DCM 20. Optical circulators are three-port devices that allow light to travel in only one direction, e.g., from port 1 to port 2, then from port 2 to port 3. This means that if some of the light emitted from port 2 is reflected back to the circulator, it is directed not back to port 1, but on to port 3. Circulators are used to achieve bidirectional transmission over a single fiber, and include high isolation of the input and reflected optical powers and low insertion loss.

The addition of the 3-port circulator 32 at the input and output of the DCM 20 makes the DCM 20 bidirectional. In the 3-port circulator 32, light entering port 1 exits port 2, while light entering port 2 exits port 3. In this embodiment, the time delay associated with the DCM 20 is therefore equal for both directions, and the DCM 20 cost is cut in half. Although additional loss may result from addition of the two 3-port circulators 32, the loss may be compensated for through additional amplification. There is a possibility of system penalty due to multi-path interference if there are parasitic reflections between the two 3-port circulators 32.

With regard to delay-equalized DCM's, DCF-based DCM's are typically specified in terms of their dispersion. For example, an 80 km Type-0 DCM is optimized to compensate for the amount of dispersion typically found in 80 km of standard single-mode fiber (e.g., SMF-28). DCF manufacturers optimize the length of DCF that they put on a spool to achieve this dispersion within specified tolerances. Because dispersion per unit length varies from batch to batch and depending on the DCF design, the length required and therefore the time delay will vary considerably. Therefore, in yet another exemplary embodiment, the present invention includes adjusting the DCF length to achieve a specific time delay, which would be more suitable for low differential latency system applications. Although this may cause dispersion variation to increase, the increase likely remains with the dispersion tolerance of the optical system.

Figure 4:
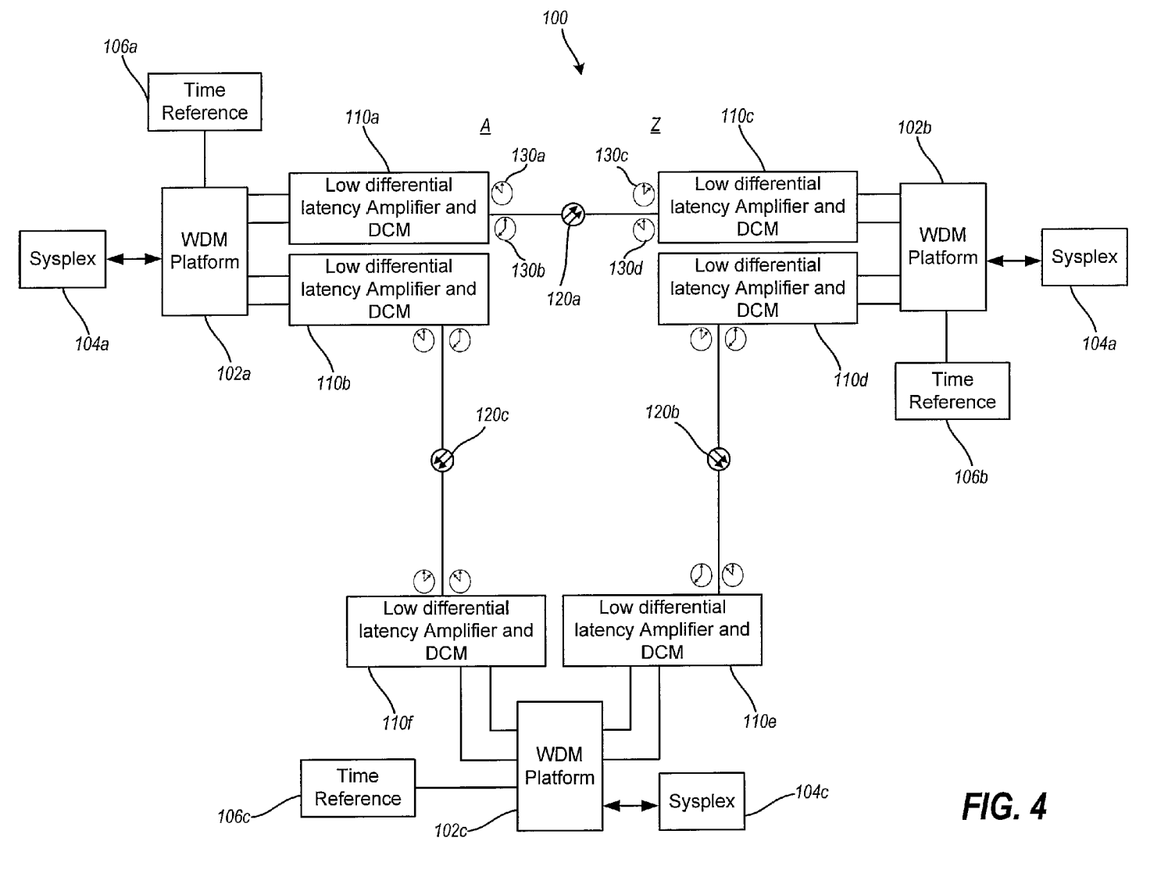
FIG. 4 is a schematic diagram illustrating a data network with low differential latency according to one exemplary embodiment of the present invention, illustrating, in particular, a three-node optical network.

Referring to FIG. 4, an extended reach low differential latency optical network 100 is shown in an exemplary embodiment of the present invention. The network 100 includes three geographically-diverse WDM platforms 102a, 102b, 102c in a ring configuration. Those of ordinary skill in the art will recognize the network 100 can include a linear, mesh, tree, star, or the like network configuration, and that the ring configuration of FIG. 4 is shown for illustration purposes. Each of the WDM platforms 102a,102b,102c is shown connecting to a sysplex 104a,104b,104c respectively. The sysplexes 104a,104b,104c can be IBM GDPS sysplexes or the like. The sysplexes 104a,104b,104c are configured to communicate to one another with data signals transmitted over extended distances through the WDM platforms 102a, 102b,102c. Also, each sysplex 104a,104b,104c is synchronized to the others, such as through the STP protocol or the like. Further, each WDM platform 102a,102b,102c is connected to a time reference 106a,106b,106c which provides an absolute time reference, and preferably include Global Positioning Satellite time references, a Building Integrated Timing Supply (BITS), and/or the like, which are continually synchronized to a very high degree. The timing reference 106a,106b,106c can provide a timing reference signal, such as a DS 1 or the like, which the WDM platforms 102a,102b, 102c can transmit along with data signals to ensure proper synchronization between platforms 102a,102b,102c.

To enable extended-reach for geographical diversity, the WDM platforms 102a,102b,102c utilize low differential latency amplifiers and DCMs 110a,110b,110c,110d,110e, 110f according to an exemplary embodiment of the present invention. For example, the amplifiers and DCMs 110 can include the single-fiber red/blue configuration 10, the two-fiber red/blue configuration 28, and the shared DCM configuration 30 presented herein in FIGS. 1, 2, and 3, respectively. Advantageously, the amplifiers and DCMs 110 enable extended reach between syslexes 104 with low differential latency allowing time-sensitive bidirectional data transfers. The amplifiers and DCMs 110a connect to the amplifiers and DCMs 110c through fiber 120a, the amplifiers and DCMs 110d connect to the amplifiers and DCMs 110e through fiber 120b, and the amplifiers and DCMs 110f connect to the amplifiers and DCMs 110b through fiber 120c. The fibers 120a,120b,120c can include one or two fibers as described herein in FIGS. 1, 2, and 3. The amplifiers and DCMs 110 are configured to ensure minimal differential latency between the transmit and receive paths in a bi-directional system. For example, the amplifiers and DCMs 110 can maintain less than +/−5 µs of the transmit/receive path differential delay requirement for the STP protocol or the like.

There is an associated time stamp 130 with each message (or frame) transmitted between sysplexes 104 between the WDM platforms 102 and amplifiers and DCMs 110. These time stamps 130 are provided by a clock incorporated in the WDM platforms 102. The clocks are synchronized to their respective time references 106. In an exemplary embodiment of the present invention, the WDM platforms 102 are configured to provide a timing signal on each transmission link, wherein the timing signal is synchronized to the time reference 106. The WDM platform 102 is configured to measure differential path delay, and to compensate for differential delay through a first-in-first-out (FIFO) buffer or the like.

In an exemplary embodiment of the present invention, a transmit/receive path differential delay is determined by first calculating the transmit path delay (e.g., amplifiers and DCMs 110a to amplifiers and DCMs 110c delay, referred to as A-Z delay), which is equal to time stamp 130a minus time stamp 130c. The receive path delay (e.g., amplifiers and DCMs 110c to amplifiers and DCMs 110a delay, referred to as Z-A delay), which is equal to time stamp 130d minus time stamp 130b, is then calculated. The transmit/receive path differential delay is simply the difference between the transmit path delay and the receive path delay.

Once measured, the transmit/receive path differential delay can be corrected for using the systems and methods of the present invention. For example, if the A-Z delay<Z-A delay, then a buildout delay equal to the transmit/receive path differential delay is selectively added in the A to Z direction via a FIFO buffer or the like. Conversely, if A-Z delay>Z-A delay, then a buildout delay equal to the transmit/receive path differential delay is selectively added in the Z to A direction via a FIFO buffer or the like. Thus, selective buffering in one direction or the other (or both) is provided to account for and cancel out the measured transmit/receive path differential delay, thus ensuring that it never exceeds specified requirements. Buffer depth is used to compensate for transmit/receive path differential delay, alleviating the need for labor-intensive and expensive "physical" fixes. Such physical fixes are complicated by the fact that components cannot be fixed together, but must be addressed individually. In accordance with the systems and methods of the present invention, delay adjustment capability is dependent upon FIFO depth and delay adjustment resolution is dependent upon FIFO width (e.g. for a 10-bit wide FIFO, the resolution for an STP operating at 2.125 Gbps is approximately 4.7 ns.

Figure 5:
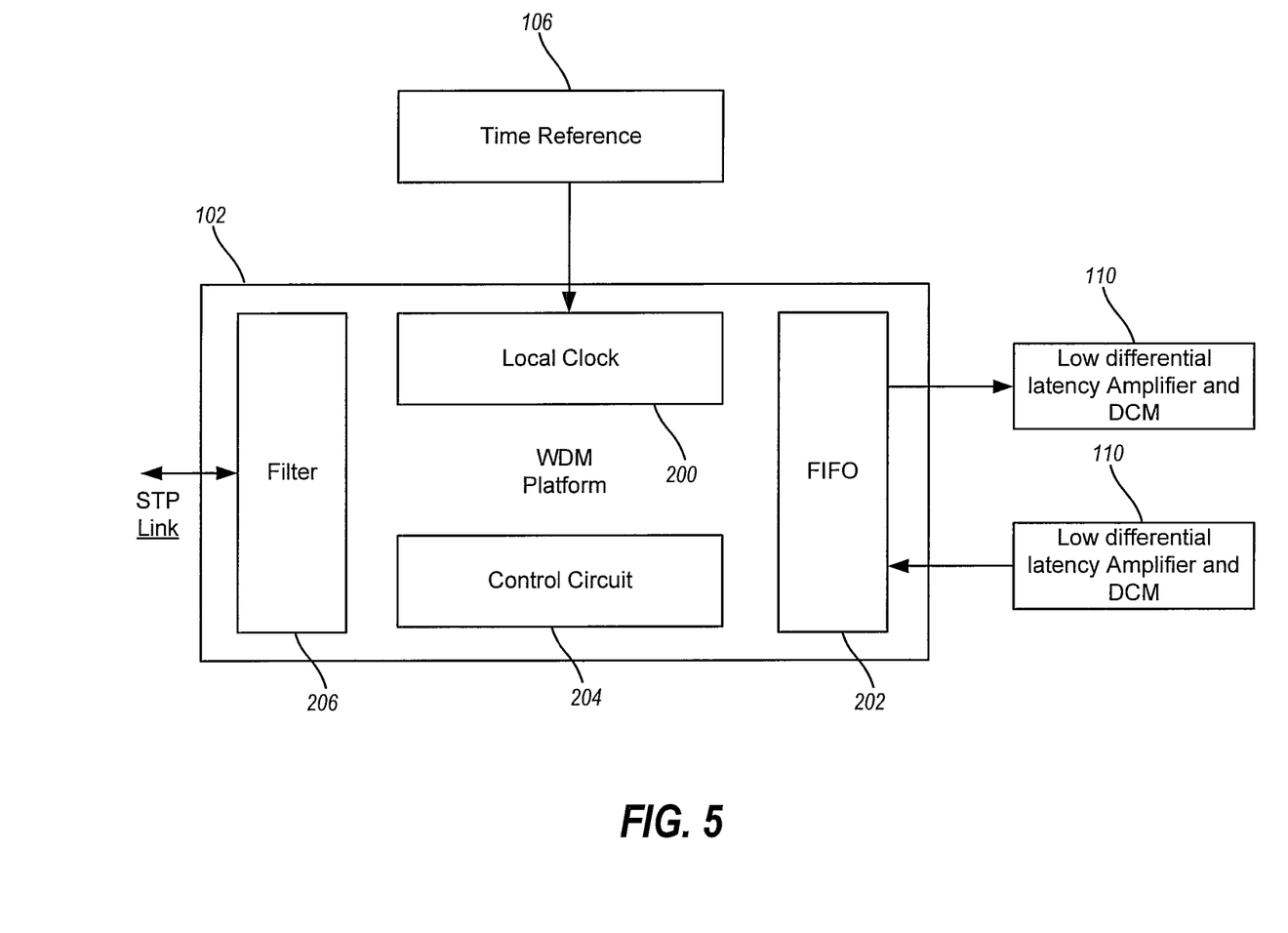
FIG. 5 is a block diagram illustrating an exemplary embodiment of the WDM platform in FIG. 4 with a local clock in communication with the timing reference and a FIFO buffer.

Referring to FIG. 5, each WDM platform 102 includes a local clock 200 which is in communication with the timing reference 106, such as a GPS time reference, BITS clock, and/or the like, and a FIFO buffer 202 and/or the like, as described above. Each WDM platform 102 also includes a control circuit 204 operable for playing data out of the FIFO buffer 202 at a predetermined rate. This predetermined rate may be varied (preferably gradually) as the transmit/receive path differential delay measured varies with changing environmental conditions, etc. In other words, the systems and methods of the present invention are real time and dynamic, the fill level of the FIFO buffer 202 being variable. For example, the 16-byte FIFO buffer 202 may be selectively changed from 10 bytes to 9 bytes, and a byte must be backed out. At a minimum, the FIFO buffer 202 should be reset at each initialization/re-initialization. Also, the control circuit 204 is further configured to receive the time stamps 130 to extract timing from the received signals. Each WDM platform further includes a filter 206 operable for averaging-out jitter and other short term delays (e.g. FIFO fill variation, optical path delay variation, etc.) that are preferably ignored.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A telecommunications transport system, comprising:
a first server complex;
a second server complex, wherein the first server complex is in communication with the second server complex via a transmit path and a receive path;
at least one dispersion compensation module;
at least one fiber amplifier; and
at least one filter operable for blocking channels in the transmit path and at least one filter operable for blocking channels in the receive path;
wherein the at least one dispersion compensation module and at least one fiber amplifier are collectively configured to minimize differential latency between the transmit and receive paths;
wherein the at least one filter operable for blocking channels in the transmit path and the at least one filter operable for blocking channels in the receive path are collectively configured to minimize differential latency between the transmit and receive paths; and
wherein the at least one filter operable for blocking channels in the transmit path and the at least one filter operable for blocking channels in the receive path comprise a plurality of 3-port bandpass filters.

2. The telecommunications transport system of claim 1, further comprising:
a mechanism for measuring a differential delay associated with the transmit path and the receive path; and
a mechanism for selectively compensating for the measured differential delay.

3. The telecommunications transport system of claim 1, wherein the differential latency between the transmit path and the receive path is maintained within +/−5 µs of a differential delay requirement in order to perform within the overall parameters of a low differential latency system architecture.

4. The telecommunications transport system of claim 1, wherein the at least one dispersion compensation module is a low latency dispersion compensation module.

5. The telecommunications transport system of claim 4, wherein the low latency dispersion compensation module comprises one of a channelized etalon dispersion compensation module, a channelized grating dispersion compensation module and a fiber Bragg broadband grating.

6. The telecommunications transport system of claim 1, wherein the transmit and receive paths comprise a bidirectional system.

7. The telecommunications transport system of claim 6,
wherein one of the at least one filter operable for blocking channels in the transmit path and the at least one filter operable for blocking channels in the receive path comprises a pair of 3-port blue bandpass filters;
wherein the other of the at least one filter operable for blocking channels in the transmit path and the at least one filter operable for blocking channels in the receive path comprises a pair of 3-port red bandpass filters;
wherein the at least one fiber amplifier comprises a pair of fiber amplifiers, a fiber amplifier located on each side of the dispersion compensation module, and wherein amplifier bandwidth is split into blue and red channels; and
wherein counter-propagating red and blue signals travel on a single fiber, sharing the pair of fiber amplifiers.

8. The telecommunications transport system of claim 6, further comprising:
a 4-port blue bandpass filter;
a 4-port red bandpass filter;
wherein the at least one fiber amplifier comprises a pair of fiber amplifiers, a fiber amplifier located on each side of the dispersion compensation module and wherein amplifier bandwidth is split into blue and red channels;
wherein a fully bidirectional low differential latency optical system is created, and wherein the red and blue signals travel on a pair of fibers, propagating on separate fibers; and
wherein the implementation of the 4-port blue bandpass filter, the 4-port red bandpass filters, the pair of fiber amplifiers, and the dispersion compensation module establish a two-fiber red/blue filter configuration and eliminate the time delay difference not only associated with the dispersion compensation module but with propagation fiber and the amplifiers.

9. The telecommunications transport system of claim 6, further comprising:
two pairs of interleavers;
wherein the at least one fiber amplifier comprises a pair of fiber amplifiers, a fiber amplifier located on each side of the dispersion compensation module, and wherein amplifier bandwidth is split into odd and even channels;
wherein a fully bidirectional low differential latency optical system is created, and wherein the red and blue signals travel on a pair of fibers, propagating on separate fibers; and
wherein the implementation of the pair interleavers, the pair of fiber amplifiers, and the dispersion compensation module establish a two-fiber/interleaver configuration and eliminate the time delay difference not only associated with the dispersion compensation module but with propagation fiber and the amplifiers.

10. The telecommunications transport system of claim 6, further comprising:
a pair of 3-port circulators, one 3-port circulator located at the input of the dispersion compensation module and one 3-port circulator located at the output of the dispersion compensation module, making the dispersion compensation module bidirectional;
wherein the at least one fiber amplifier comprises a pair of fiber amplifiers one each side of the pair of 3-port circulators on each side of the dispersion compensation module;
wherein two separate line systems are employed, providing the entire amplifier bandwidth available in each direction; and
wherein the time delay associated with the dispersion compensation module is substantially equal for both directions.

11. The telecommunications transport system of claim 1,
wherein the at least one dispersion compensation module is a delay-equalized dispersion compensation module; and
wherein a dispersion compensating fiber located within the dispersion compensation module has an adjusted dispersion compensating fiber length to achieve a specific time delay, thus providing suitability for low differential latency system applications.

12. The telecommunications transport system of claim 1, wherein the first server complex and the second server complex each comprise a Geographically-Dispersed Parallel Sysplex that utilizes a Server Time Protocol.

13. A telecommunications transport method for maintaining a relative accuracy of clock time between various servers used in various multi-site enterprises, the method comprising:
providing a first server complex;
providing a second server complex, wherein the first server complex is in communication with the second server complex via a transmit path and a receive path;
providing an at least one dispersion compensation module;
providing an at least one fiber amplifier, wherein the at least one fiber amplifier and the at least one dispersion compensation module are operative to extend the reach between the first and second server complex; and
providing at least one filter operable for blocking channels in the transmit path and at least one filter operable for blocking channels in the receive path;
wherein the first server complex, the second server complex, the transmit path, and the receive path collectively form an optical low differential latency system; and
wherein the at least one filter operable for blocking channels in the transmit path and the at least one filter operable for blocking channels in the receive path comprise a plurality of 3-port bandpass filters.

14. The telecommunications transport method of claim 13, further comprising:
measuring a differential delay associated with the transmit path and the receive path; and
selectively compensating for the measured differential delay.

15. The telecommunications transport method of claim 13, wherein the differential latency between the transmit path and the receive path is maintained within +/−5 microseconds of a differential delay requirement in order to perform within the overall parameters of a low differential latency system architecture.

* * * * *